United States Patent [19]
Tian et al.

[11] Patent Number: 5,497,085
[45] Date of Patent: Mar. 5, 1996

[54] METHOD FOR DETERMINING AN OUTER DIAMETER ROLLOFF IN A PROCESS FOR MAKING MAGNETIC DISKS

[75] Inventors: Hong Tian, Milpitas; Jia-Kuen J. Lee, San Jose; Ellis T. Cha, Santa Clara, all of Calif.

[73] Assignee: Conner Peripherals, Inc., San Jose, Calif.

[21] Appl. No.: 358,282

[22] Filed: Dec. 19, 1994

[51] Int. Cl.$^6$ ........................................................ G11B 5/60
[52] U.S. Cl. ............................................ 324/212; 360/137
[58] Field of Search ................................. 356/3; 360/135, 360/137; 364/560, 561, 562, 563, 564

[56] References Cited

U.S. PATENT DOCUMENTS 5,168,413  12/1992  Coker et al. ........................... 360/137
5,410,439  4/1995  Egbert et al. ........................... 360/137

Primary Examiner—Sandra L. O'Shea
Assistant Examiner—Roger Phillips
Attorney, Agent, or Firm—Felix L. D'Arienzo, Jr.

[57] ABSTRACT

A method is shown for testing a magnetic disk to be used in a disk drive. The method includes the steps of measuring a height profile of an outer radial edge of the disk, using the profile to determine a slope value for each of a pair of radial segments of the disk, calculating a difference value between the slope values of the pair, comparing the difference value to a preselected threshold difference value and indicating when the difference value is equal to or less than the threshold difference value. The threshold value indicates an outer most diameter of the disk where fly height operation for a head is still stable.

16 Claims, 9 Drawing Sheets

Table 1  Correlation between OD rolloff parameters with glide performance

| Disk | OD Rolloff Value (μm) | | Rolloff Point (mm) | Glide Performance |
|---|---|---|---|---|
| | $R_2$=46.0mm | $R_2$=46.5mm | $R_2$=47.0mm | Critical slope change=0.0001 | PZT Signal>0.05V |
| TYPE A | 0.038 | 0.086 | 0.398 | 46.07 | 46.0 (mm) |
| TYPE B | 0.028 | 0.040 | 0.098 | 46.54 | 46.6 (mm) |
| TYPE C | 0.020 | 0.018 | 0.137 | 46.34 | 46.3 (mm) |
| TYPE D | 0.029 | 0.035 | 0.078 | 46.72 | 46.8 (mm) |

*$R_1$=42.5mm for calculation of OD rolloff values.

METHOD FOR DETERMINING AN OUTER DIAMETER ROLLOFF IN A PROCESS FOR MAKING MAGNETIC DISKS

FIELD OF THE INVENTION

The present invention is directed to disk drives. More particularly, the present invention provides an efficient and accurate method for determining an outer diameter rolloff for each magnetic disk to be used in a disk drive. The present invention can be implemented during a process of magnetic disk manufacture to assure that only disks having at least a preselected maximum radius for a data track band, are made available for assembly into disk drives.

BACKGROUND OF THE INVENTION

Disk drives are commonly used in workstations, personal computers, laptops and other computer systems to store large amounts of data that are readily available to a user. In general, a disk drive comprises a magnetic disk that is rotated by a spindle motor. The surface of the disk is divided into a series of data tracks. The data tracks are spaced radially from one another across a band having an inner diameter and an outer diameter. As should be understood, to maximize the amount of data that can be stored on a disk surface, the inner and outer diameters of the data track band should be as close as possible to the inner and outer diameters of the disk itself.

Each of the data tracks extends generally circumferentially around the disk and can store data in the form of magnetic transitions within the radial extent of the track on the disk surface. An interactive element, such as a magnetic transducer, is used to sense the magnetic transitions to read data, or to generate an electric current that causes a magnetic transition on the disk surface, to write data. The magnetic transducer includes a read/write gap that contains the active elements of the transducer at a position suitable for interaction with the magnetic surface of the disk.

As known in the art, the magnetic transducer is mounted by a head structure to a rotary actuator and is selectively positioned by the actuator over a preselected data track of the disk to either read data from or write data to the preselected data track of the disk, as the disk rotates below the transducer. The head structure includes a slider having an air bearing surface that causes the transducer to fly above the data tracks of the disk surface due to fluid currents caused by rotation of the disk. The air bearing surface of the slider has a leading edge and a trailing edge. Typically, in currently used heads, such as, e.g., Transverse Pressure Contour (TPC) heads, two spaced rails are arranged to extend longitudinally along the lateral sides of the air bearing surface, one adjacent each lateral side, from the leading edge to the trailing edge of the surface. The rails provide various pressure effects to cause head flying operation.

Thus, the transducer does not physically contact the disk surface during normal operation of the disk drive. The amount of distance that the transducer flies above the disk surface is referred to as the "fly height". It is a design goal to maintain the fly height of the head at an even level regardless of the radial position of the head.

In modern disk drives, a relatively rigid or hard disk is used as the magnetic medium. The disk comprises a hard substrate such as aluminum. Layers of various materials are applied to the surface of the aluminum substrate by, e.g., a sputtering process to provide layers that are substantially smooth and flat. The surfaces obtained from the sputtering process are designed to facilitate an even fly height for the head. The layered materials include a layer of magnetic material to provide the recording medium for the magnetic transitions representing data.

Typically, the outer diameter of the substrate is slopped at the radial outer end of the disk shape. This is referred to as the rolloff of the disk. Thus, at the outer diameter of the disk, the disk surface is no longer flat and usable to sustain a stable fly height of the air bearing surface of the head. Indeed, the flying behavior of the air bearing surface can become unstable if the head moves too far into the rolloff region of the disk, which can result in contact between the head and the disk surface. Any contact between the head and the disk surface may result in damage to the disk or head leading to early disk drive mechanical failure.

Accordingly, it is important to design the disk drive such that the outer diameter of the data track band is spaced suitably inward from any portion of the disk rolloff region where fly height degradation can occur when reading data from or writing data to. data tracks arranged at the outer diameter of the data track band. However, it is desirable that each disk used in a disk drive have a maximum radius relevant to the rolloff region that is equal to or greater than a preselected threshold radius so as to not impact the radial extent of the data track band beyond an acceptable amount.

To that end, during the manufacture of magnetic disks that are to be used in a disk drive, a check should be made of the rolloff radius of each disk as it moves through the manufacturing process, so as to reject any disk having a rolloff radius less than the preselected threshold value. In this manner, each disk made available for assembly into a disk drive will be able to accommodate a maximum data track band width for a maximized data capacity for the drive, without undesirable fly height instability at the data tracks near the outer diameter of the data track band.

At present, the rolloff radius for a disk used in a disk drive is determined by reference to a "dub-off" value. The dub-off value is defined as the maximum height undulation between two radii of the disk at the outer diameter. However, it has been determined that the dub-off value does not provide adequate information regarding fly height stability for a head positioned at a data track near or at the outer diameter of the data track band. In fact, there is a poor correlation between the dub-off value and fly height performance. Accordingly, the presently known disk measurement procedures do not provide an adequate system or process for achieving a reliable quality control for disks relevant to maximizing data capacity by assuring compliance by each disk with a maximum data band width having fly height stability at the outer diameter of the band.

SUMMARY OF THE INVENTION

The present invention provides an efficient and accurate method for determining an outer diameter roll-off value for a magnetic disk that provides information relevant to fly height stability. The present invention can be implemented in a disk manufacturing process to insure that each disk passing through the manufacturing process has an acceptable outer diameter roll-off value that accommodates stable fly height at the outer data tracks of a maximized data track band width.

According to the present invention, profile information relating to the outer edge of each disk is obtained by using a profilometer or metrology tool. The profile information is analyzed by a processor to calculate the slope of the disk surface at the rolloff region of the disk, at each of a sequence of radial segments of the disk. The sequence of radial segments begins at a starting point near the outermost radius of the disk, and continues to the outermost radius of the disk. The radial extent of each segment covers a distance approximately equal to a width dimension of a head to be used with the disk. For example, the slope is taken over a radial segment approximately equal to the width of an air bearing surface of the head.

Various pairs of points within the rolloff region of the disk surface are then selected, with each point of a pair being located in a different radial segment, e.g., at the center point of each respective segment. The two points of each pair are spaced from each other by a dimension also relevant to a width dimension of the respective head, e.g., when the head has a rail arrangement, as discussed above, the distance between the radii defined by the rails can be used. The change in slope between the points of each pair is plotted. The pairs of points are selected to provide slope change information from the beginning of the rolloff region to and including the outermost radius of the disk.

According to the present invention, the rolloff point is defined as the maximum radius at which the absolute value of the slope change between points of a pair, including the maximum radius at the outermost point of the pair, is less than or equal to a preselected threshold value. The threshold value is determined empirically, and is selected to be a value of the slope change at which fly height performance of a head to be used with the disk, is stable. The maximum radius for each disk, as determined by the method of the present invention, is then compared to a specified maximum radius desired for disks to be assembled into disk drive products, to determine if the disk is acceptable for assembly into a disk drive.

The rolloff method according to the present invention is based upon the geometry of a head to be used with the disk and the method determines a value for a maximum radius that is closely related to fly height performance for the head. When used as a quality control step in a process for manufacturing disks, the system and method of the present invention assures assembly of high quality disks in respect of fly height stability of a head at the outer diameter of a data track band designed to maximize the storage capacity of the disk.

BRIEF DESCRIPTION OF THE DRAWINGS

FIG. 8 is a table comparing a conventional dub-off value (designated as OD Rolloff Value in μm), and slope change, according to the present invention, each correlated to fly height performance.

DETAILED DESCRIPTION

Figure 1:
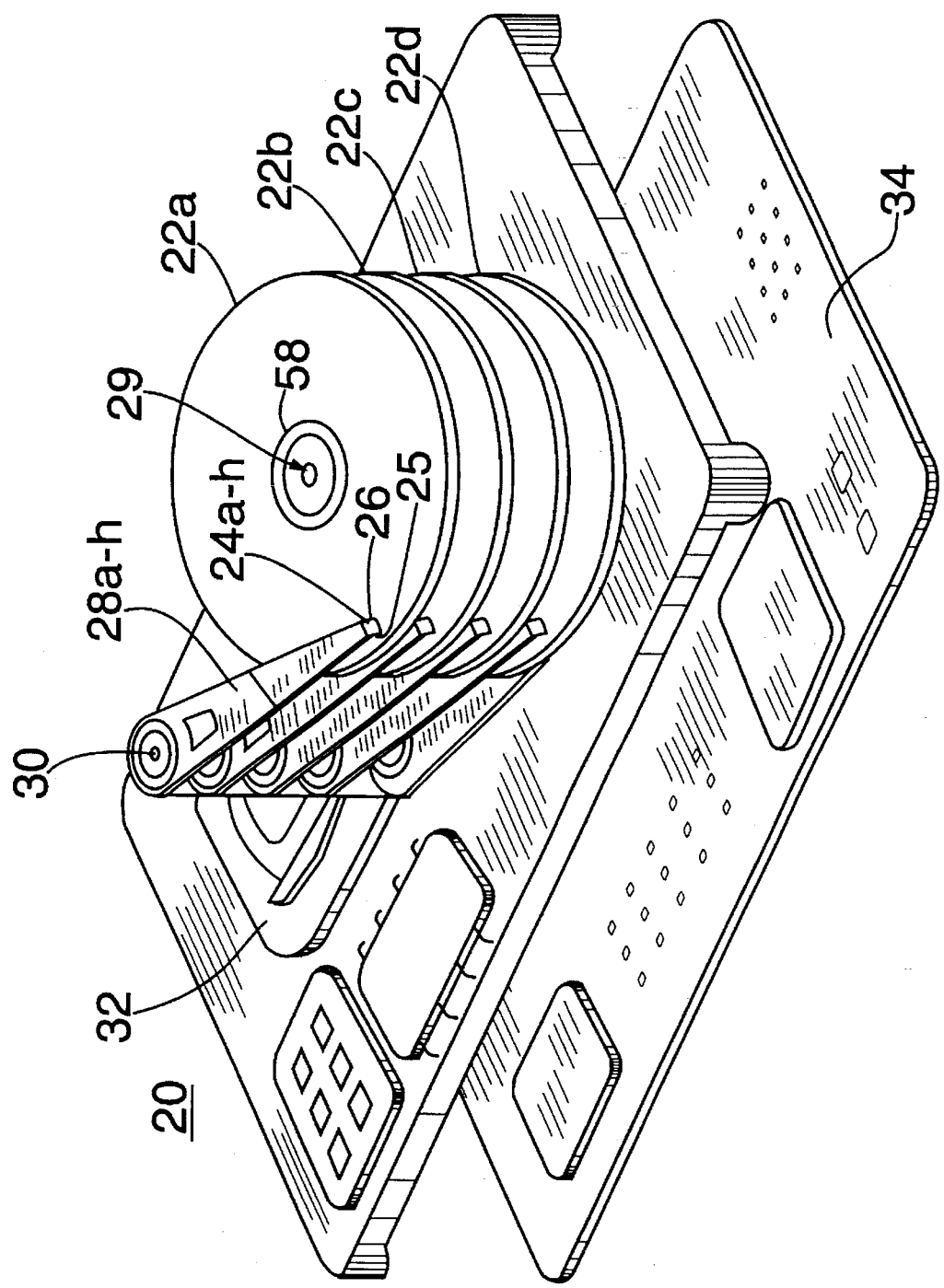
FIG. 1 is perspective view of a representative disk drive.

Referring now to the drawings, and initially to FIG. 1, there is illustrated an exemplary disk drive designated generally by the reference numeral 20. The disk drive includes a plurality of storage disks 22a–d and a plurality of read/write heads 24a–h. Each of the storage disks 22a–d is provided with a plurality of data tracks to store user data. As illustrated in FIG. 1, one head is provided for each surface of each of the disks 22a–d such that data can be read from or written to the data tracks of all of the storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are pivotally mounted on a pin 30 by a voice coil motor 32 operable to controllably rotate the actuator arms 28a–h radially across the disk surfaces.

Each of the read/write heads comprises a magnetic transducer 25 mounted to a slider 26 having an air bearing surface. As typically utilized in disk drive systems, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h to position each of the read/write heads 24a–h over a respective landing zone 58, where the read/write heads 24a–h come to rest on the storage disk surfaces.

Figure 2:
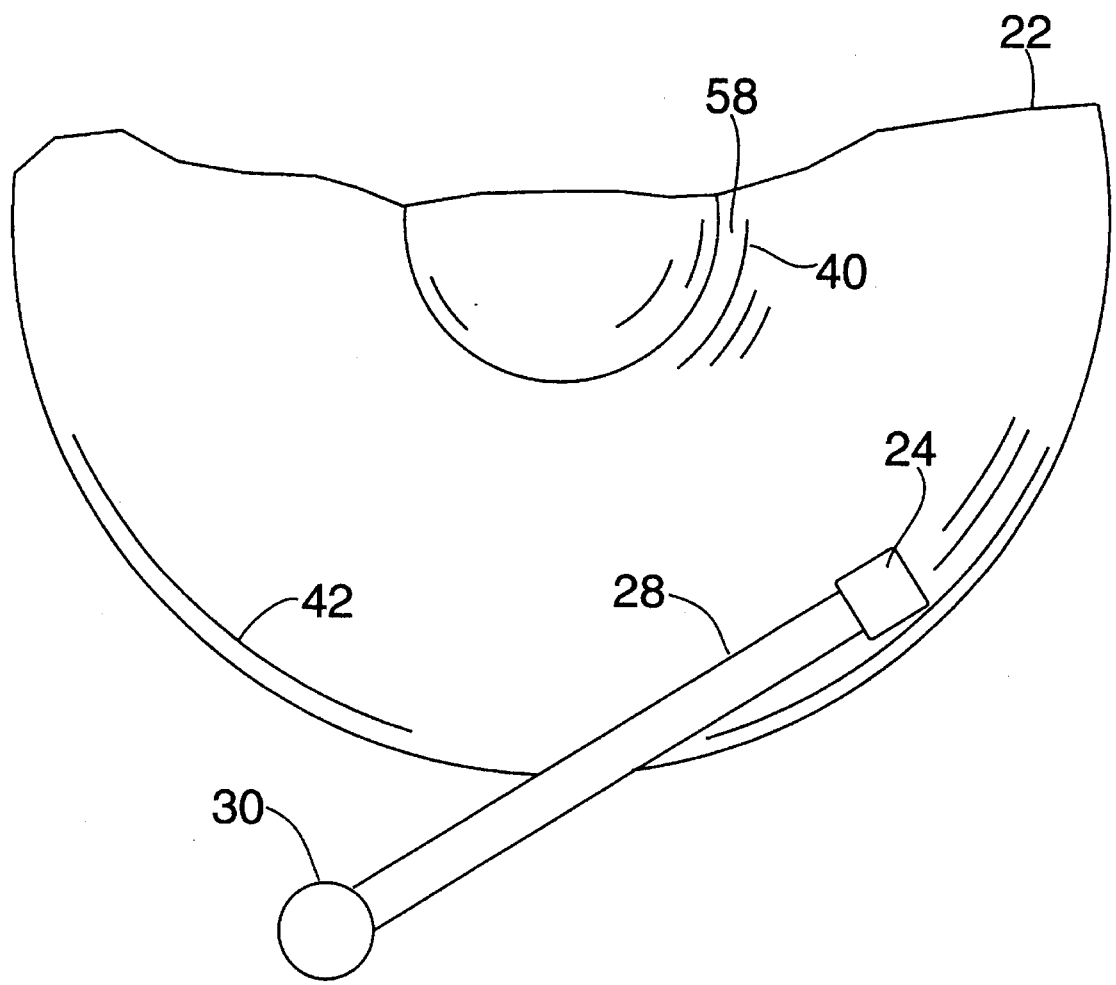
FIG. 2 is a partial, top plan view of a disk and actuator arm/head arrangement of the disk drive of FIG. 1.

A printed circuit board (PCB) 34 is provided to mount control electronics for controlled operation of the spindle motor 29 and the voice coil motor 32. The PCB 34 also incudes read/write channel circuitry coupled to the read/write heads 24a–h, to control the transfer of data to and from the data tracks of the storage disks 22a–d. The manner for coupling the PCB 34 to the various components of the disk drive is well known in the art. Referring to FIG. 2, the data tracks extend across each surface of the storage disks 22a–d within a band having an inner diameter 40 and an outer diameter 42. The actuator arms 28a–h are controlled by the control electronics on the PCB 34, during read/write operations, to position the respective heads 24a–h over preselected data tracks within the bands defined by the diameters 40, 42. As should be understood, it is desirable for the outer diameter 42 of each disk surface to be as close to the outer diameter of the disk 22a–d, as possible, to provide a maximum radial width for storing data on the disk surfaces.

Figure 3A:
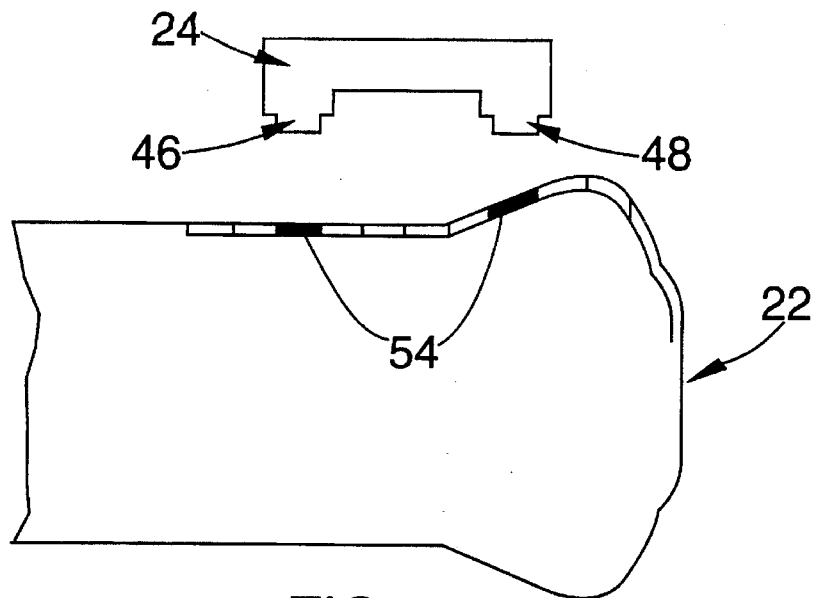
FIGS. 3a and 3b each depict an exploded view of the end of the disk of FIG. 2, including the head at a fly height over the disk surface.
Figure 3B:
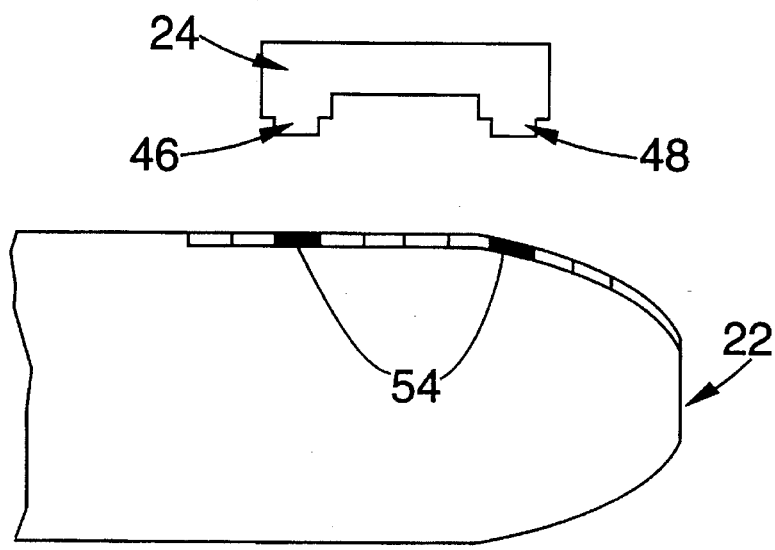

Referring now to FIGS. 3a and 3b, there is illustrated an exploded end view of each of two types of disk ends commonly found in disk drives. In FIG. 3a, the slope of the surface of the disk 22 first moves upward, before turning downward at the outermost diameter of the disk 22. This is referred to as a "ski jump" type disk. In FIG. 3b, the surface of the disk 22 gradually tapers from a flat surface to a curved surface at the outermost diameter of the disk 22. In each of FIGS. 3a and 3b, there is also shown a head 24, including air bearing surfaces comprising rails 46 and 48. The rails 46, 48 cause the head 22 to fly above the surface as shown in the drawing.

As known in the art, the fly height of the head becomes unstable when the rails 46, 48, and particularly outer rail 48, approaches the curved portions of the outer diameter of the disk 22. Thus, the outer diameter 42 of the data track band is placed at a suitable distance from the curved rolloff region to maintain an acceptable and stable fly height of the head 22 during read/write operations at the outer diameter 42. Due to manufacturing tolerances, the precise curved configuration for each particular disk will vary. Accordingly, it is desirable that the curved configuration, as shown in either FIGS. 3a and 3b, for any particular disk 22 assembled into the drive 20 not impact fly height stability within a preselected maximum radius for the outer diameter 42.

Figure 4:
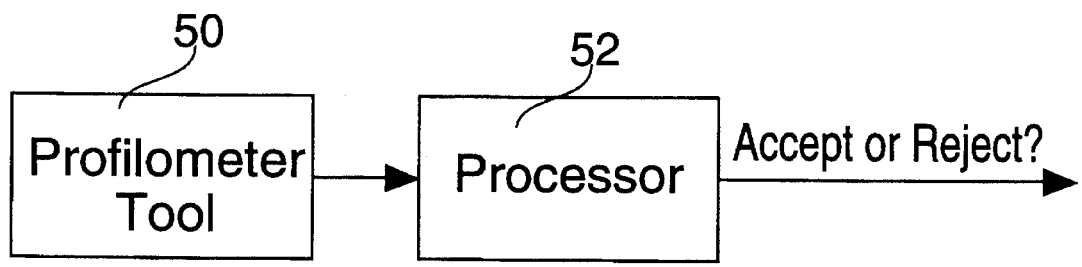
FIG. 4 is a block diagram of an exemplary quality control disk test system according to the present invention.

FIG. 4 shows, in block diagram form, an exemplary quality control test system according to the present invention for screening each disk 22a–d, prior to assembly into the disk drive 20, to make certain that fly height stability is acceptable at the selected value for the outer diameter 42 of the data track band. To advantage, the testing according to the present invention can be performed by the quality control system on a substrate prior to sputtering to make a magnetic disk. In this manner, the suitability of a disk is determined at an early stage of a manufacturing process, and the sputtering process to make magnetic disks is performed using substrates that are already shown acceptable in respect of fly height stability.

A profilometer or metrology tool 50, such as a production mechanical metrology tool sold commercially by Tencor Instruments of Mountain View, California or optical profilometers, as sold by Zygo of Middlefield, Conn. and Wyco of Tucson, Ariz., can be used to obtain disk end height profile information corresponding to the disk end shapes shown in FIGS. 3a and 3b, for each disk 22a–d. The height profile information can, as discussed above, be performed on substrates that will be used to make magnetic disks. The profilometer is coupled to a processor 52 to transmit the disk end height profile information for processing according to the present invention.

As shown conceptually in each of FIGS. 3a and 3b, the processor 52 divides the surface of a disk or substrate being tested into radial segments 54. The radial extent of each segment is approximately equal to the width of one of the air bearing rails 46, 48 of the head 24 that will be used in the disk drive 20 to read or write data from or to the disk being tested. The processor 52 then calculates the slope of each segment 54.

Thereafter, the processor 52 selects pairs of segments 54, with the segments 54 of each pair being separated by a distance equal to the radial spacing between the rails 46, 48 of the head 24, as shown for one pair by the darkened segments in FIGS. 3a and 3b. The absolute value of the difference or change between the slopes of the segments 54 of each pair is then calculated by the processor 52.

According to the exemplary embodiment of the present invention, the maximum radius for stable fly height operation, i.e. the rolloff point, is the radius at the outer segment 54 of a pair wherein the slope change is equal to or less than a predetermined value. The predetermined value is set empirically, as, e.g., via simulation of disk operation, to provide a value for slope change at which fly height operation of a head is still stable. In one operation of a test system according to the invention, the predetermined value for absolute slope change was found to be 0.0001.

The rolloff point for each disk or substrate tested, as determined by the processor 52, is then compared to a desired value for the outer diameter 42 for the data track band. The desired value for the outer diameter 42 is, of course, selected to obtain a maximum radial extent for the data track band, to be able to store as much data as possible on the disk. The disk tested will be assembled into the disk drive 20 only if the rolloff point calculated by the processor 52 is equal to or greater than the desired value to make certain that only disks having a stable fly height operation at the desired outer diameter 42 are used in the disk drive 20. In the case of testing of a substrate, the substrate will only be used to make a magnetic disk if the rolloff point calculated by the processor 52 for the substrate is equal to or greater than the desired value. The processor 52 has an accept/reject output to indicate whether a disk or substrate being tested is suitable for assembly into the disk drive 20.

The quality control test method of the present invention determines a rolloff point using profile information that is closely related to head geometry, and, accordingly, provides a value for a maximum radius having a close correlation to fly height stability.

Figure 5:
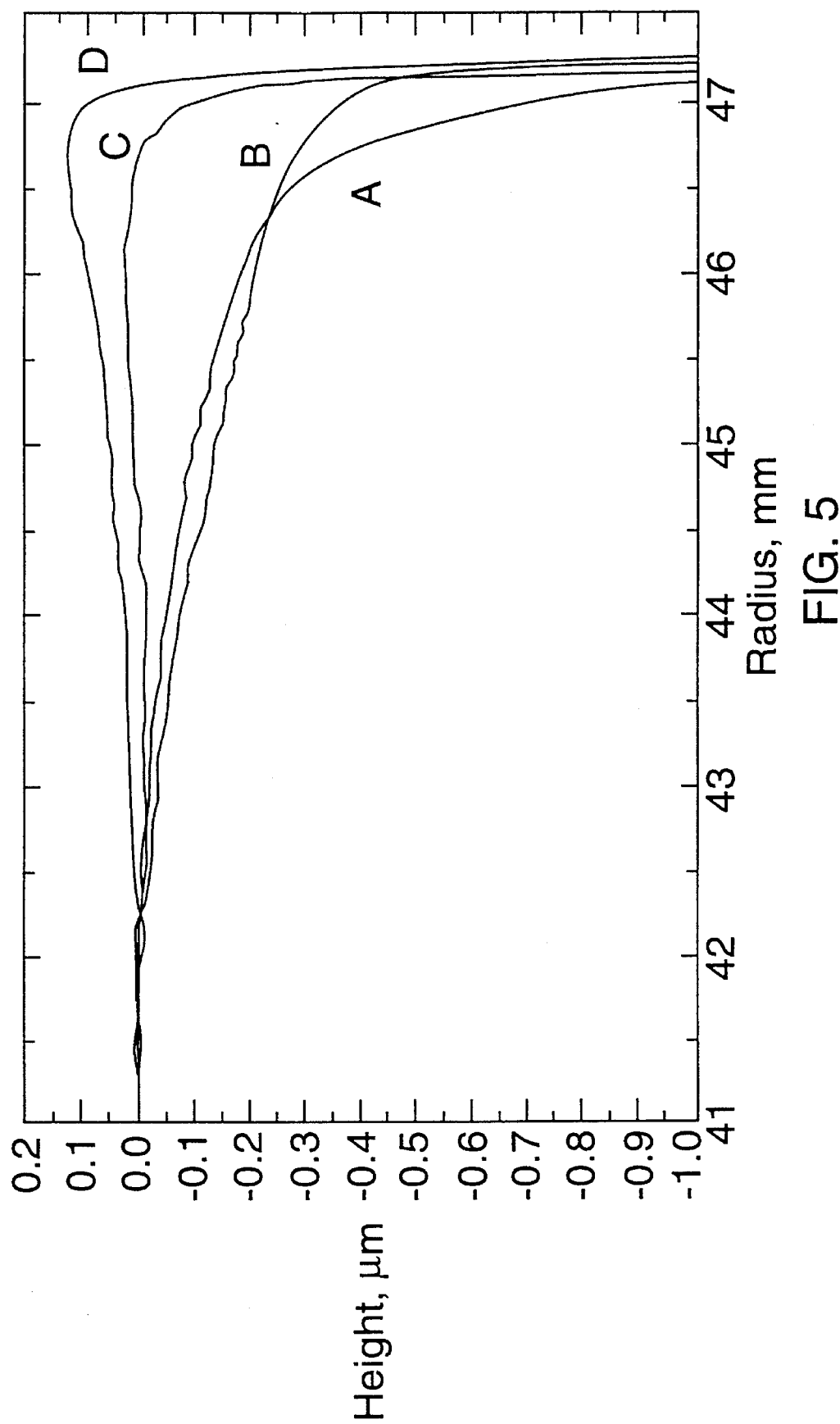
FIG. 5 is a graph showing a height profile for four representative disks.

FIG. 5 illustrates in graph form, the height profile for each of four representative disks labeled A, B, C and D. The height profile is typically determined by a disk manufacturer to show the geometry, in μ inches, of the end of the disk, relative to a reference for the disk surface. As can be seen in FIG. 5, each of the disks A, B, C and D has a nearly zero change from the reference value, until the outer diameters are reached, at approximately between 44 and 46.5 mm. At that radius, the deviations for the disks A, B, C and D, from the surface reference value, begin to rise and fall rapidly, indicating curved surface configurations of the types shown in FIGS. 3a and 3b. Disks A and B show the typical rolloff profile as shown in FIG. 3b, while disks C and D have a ski-jump type of rolloff profile, illustrated in FIG. 3a.

Figure 6:
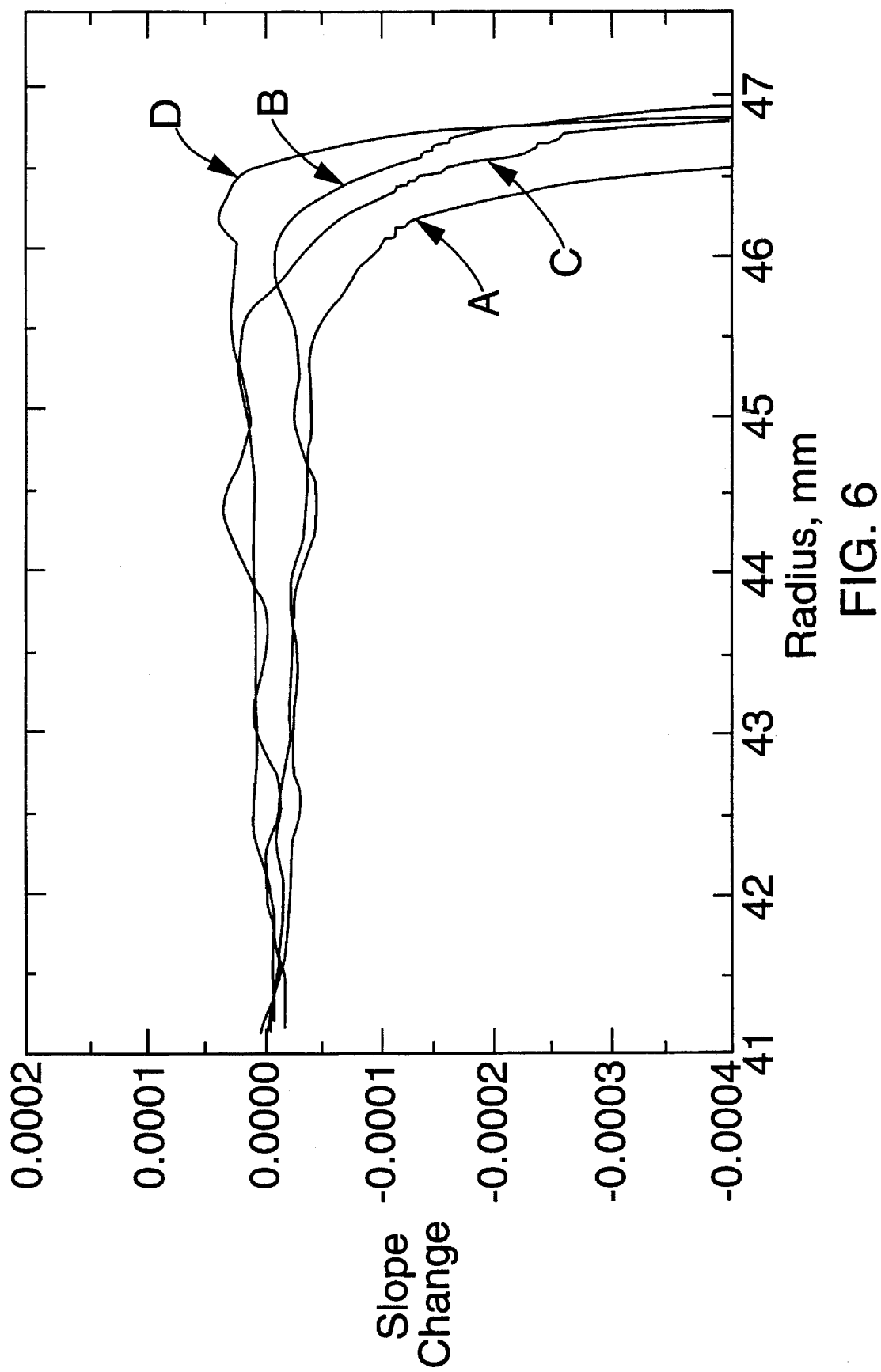
FIG. 6 is a graph showing slope change, according to the present invention, experienced by a head for each of the disks depicted in the graph of FIG. 5.

FIG. 6 illustrates in graph form, the slope change, as measured by the present invention, for each of the four representative disks, again labeled A, B, C and D on the graph. As can be seen in FIG. 6, the slope change values begin to change rapidly from a zero value at the outer radii of the disks A, B, C and D, in approximately the same region (46 mm) as shown by the height profile to be the end of the respective disk.

Figure 7:
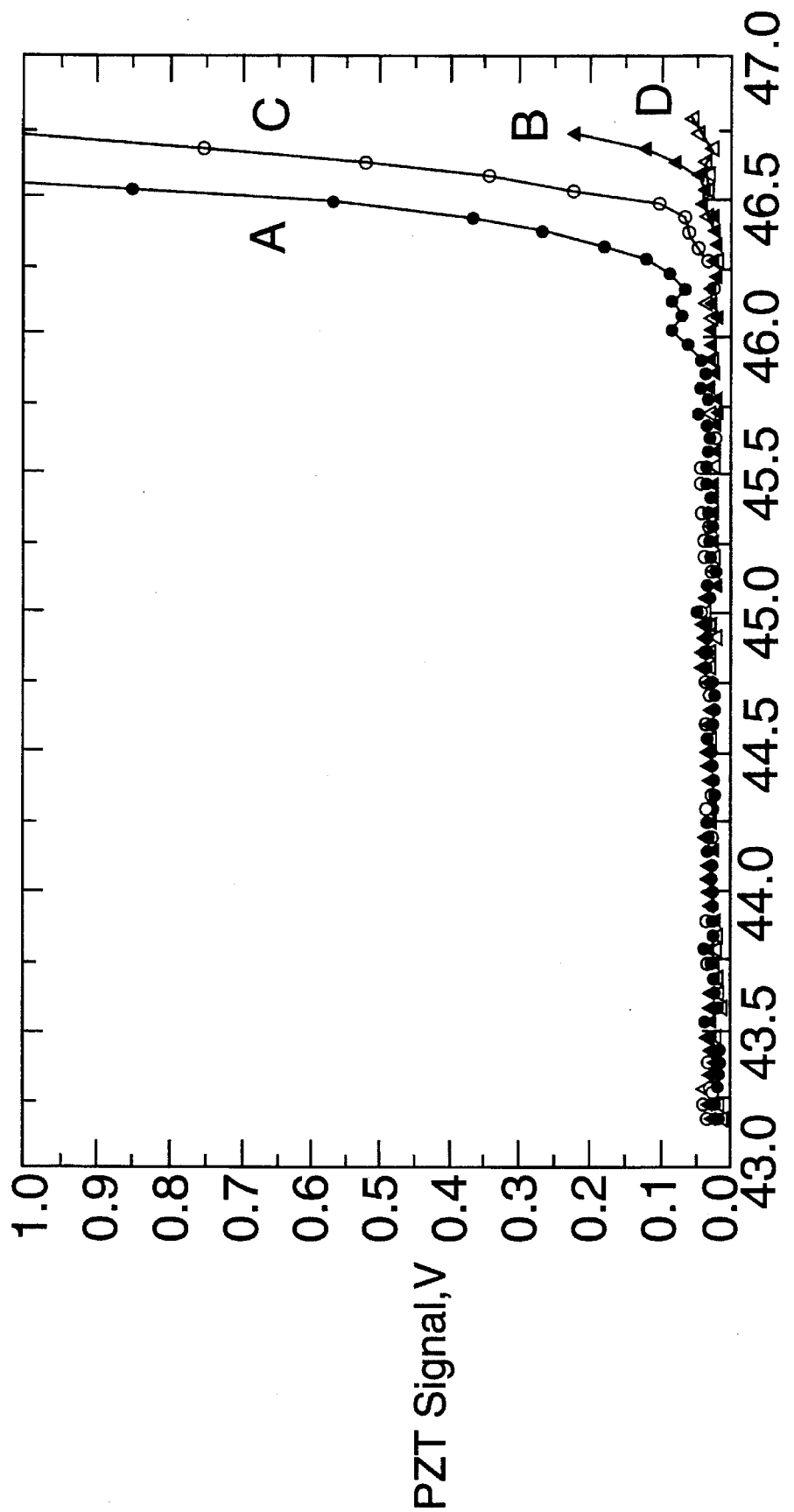
FIG. 7 is a graph showing slider testing of a head in respect of the four disks of FIG. 5.

FIG. 7 provides additional indications of slope change effects upon a head. In a test conducted with the four disks A, B, C and D, a PZT device was attached to a head operating, in turn, over each of the disks A, B, C and D. The PZT device generates an electric signal when vibrated mechanically, as, e.g., when the head contacts the disk surface. As can be seen in FIG. 7, the PZT signal, measured in volts, jumps at radii of between 46 and 46.5 mm, indicating head/disk contact at the rolloff regions of the disks, as shown in FIGS. 5 and 6.

The table of FIG. 8 shows the close correlation between the rolloff point determined for each of disks A, B, C and D, using the present invention, and the radius at which PZT voltage value becomes greater than 0.05 volts, indicating head/disk contact. As can be seen from the table, the PZT voltage values are at radii approximately equal to the rolloff point for the respective disk, as determined by the present invention. The table also shows prior art dub-off values for the disks (designated as OD Rolloff Value in µm), each of which shows a large jump in value at 47 mm, beyond the actual rolloff value where head/disk contact occurs, as indicated by the PZT signal strength. Thus, the presently used disk rolloff measurement does not accurately correlate rolloff information to fly height stability.

Figure 9:
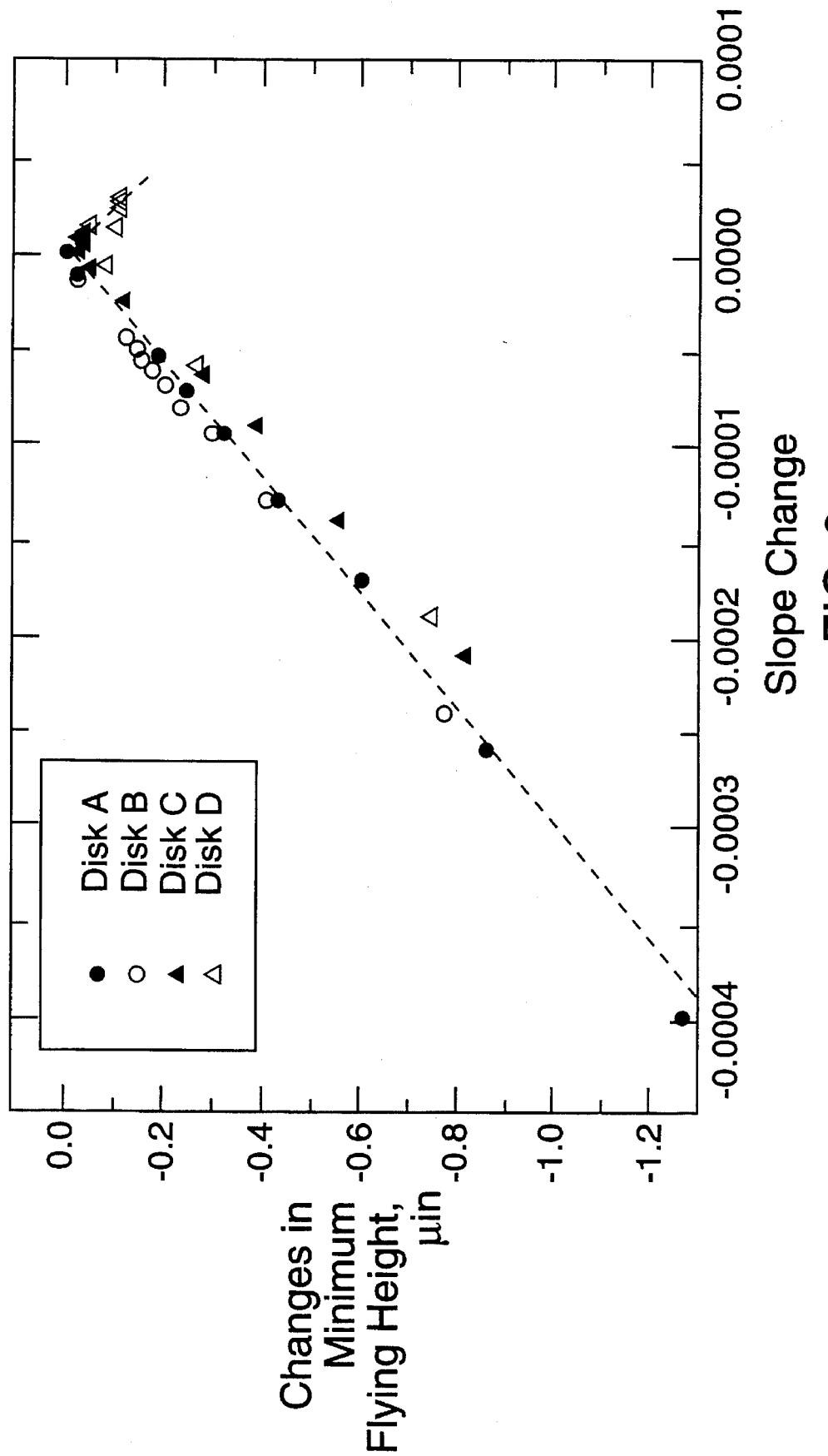
FIG. 9 is a graph showing the change in minimum fly height for a 70% glide head at zero skew, in each of the disks of FIG. 5, as a function of slope change, and illustrating the proportionality between the minimum fly height and slope change.

FIG. 9 provides additional information for the disks A, B, C and D, on changes in fly height (glide height in this instance), versus slope change of the type measured by the method of the present invention. The glide shown of FIG. 9 is measured from a disk surface. As can be seen, glide height degradation is above −0.2µ inches at a slope change value of 0.0001, and between −0.3 and −0.4µ inches at a slope change value of −0.0001. These values have been found to correlate to acceptable fly height stability.

Figure 10:
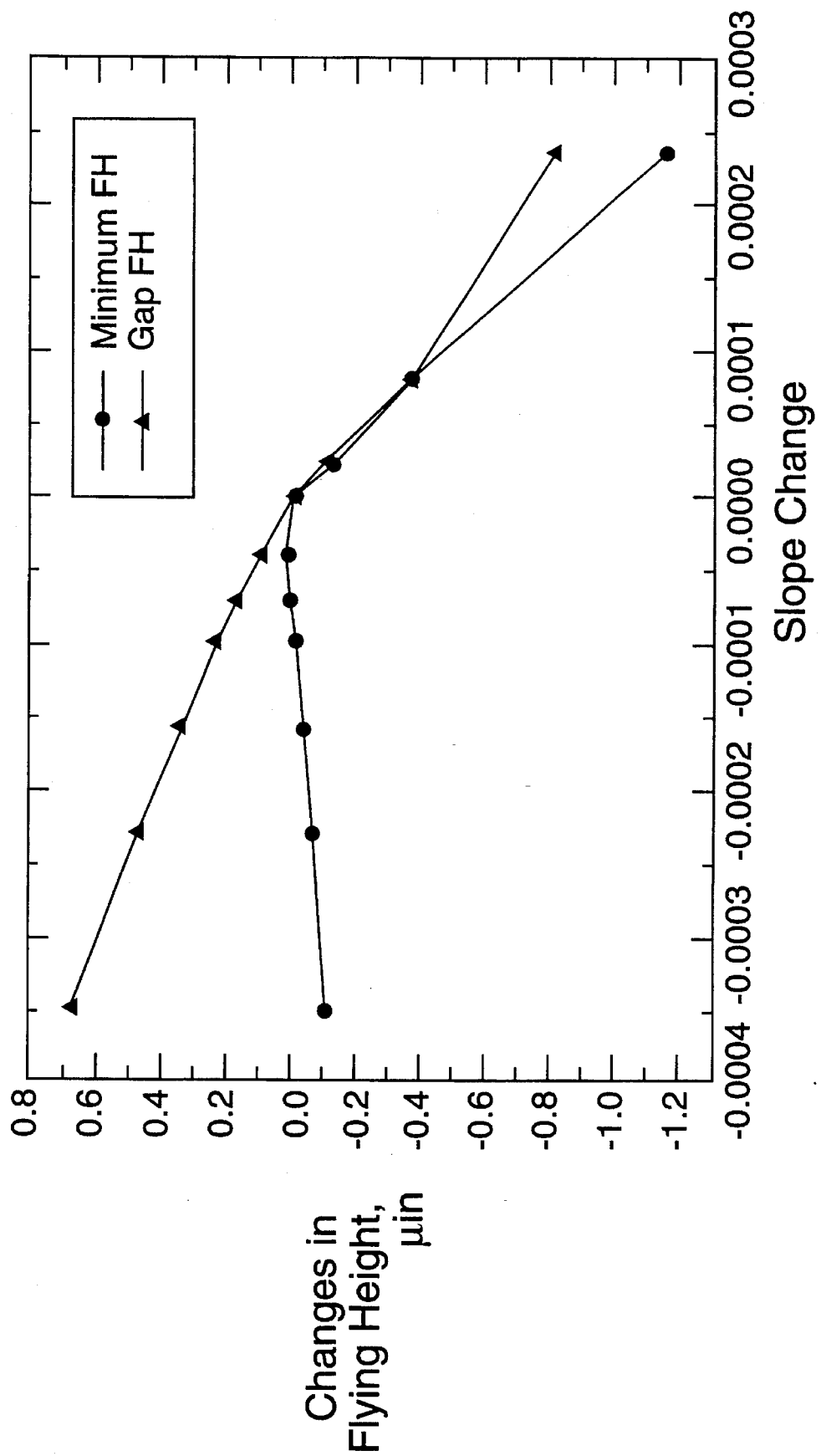
FIG. 10 is a graph showing changes in each of gap fly height and minimum fly height for a TPC head at correct skew angle, each as a function slope change.

FIG. 10 is a graph showing changes in each of gap fly height and minimum fly height for a TPC head at correct skew angle, each as a function of slope change. This graph also shows acceptable changes in fly height for each of the read/write gap of the transducer, and the minimum fly height for the head itself, at absolute values for slope change of 0.0001. FIG. 10 shows the skew effect on the head, as it relates to fly height degradation.

What is claimed is:

1. A method for testing a magnetic disk to be used in a disk drive, comprising the steps of:

measuring an outer radial edge of the disk, along a radius extending outwardly from the center of the disk, to obtain a series of dimensions representing a height profile:

determining, as a function of the dimensions, a slope value for each of a sequence of radial segments of the disk;

selecting pairs of slope values, and for each pair of slope values, calculating a difference value between the slope values of the pair;

comparing each difference value to a preselected threshold difference value; and indicating the difference value which is equal to or less than the threshold difference value.

2. The method of claim 1, comprising the further steps of:

correlating the indicated difference value to a radius of the disk;

comparing the correlated radius to a predetermined radius value; and indicating when the correlated radius is equal to or greater than the predetermined radius value.

3. The method of claim 1 wherein each radial segment has a radial length approximately equal to the width of an air bearing surface of a head.

4. The method of claim 3 wherein the air bearing surface comprises one of a pair of rails formed on the head.

5. The method of claim 4 wherein the radial segments corresponding to slope values of a pair, are spaced from each other by an amount approximately equal to the spacing between the pair of rails.

6. The method of claim 1 wherein the disk comprises a substrate.

7. A method for testing a magnetic disk to be used in a disk drive, comprising the steps of:

measuring an outer radial edge of the disk, along a radius extending outwardly from the center of the disk, to obtain a series of dimensions representing a height profile;

determining, as a function of the dimensions, a slope value for each of a pair of radial segments of the disk;

calculating a difference value between the slope values of the pair;

comparing the difference value to a preselected threshold difference value; and indicating when the difference value is equal to or less than the threshold difference value.

8. The method of claim 7, comprising the further steps of:

correlating the indicated difference value to a radius of the disk;

comparing the correlated radius to a predetermined radius value; and indicating when the correlated radius is equal to or greater than the predetermined radius value.

9. The method of claim 7 wherein each radial segment of the pair has a radial length approximately equal to the width of an air bearing surface of a head.

10. The method of claim 9 wherein the air bearing surface comprises one of a pair of rails formed on the head.

11. The method of claim 10 wherein the radial segments are spaced from each other by an amount approximately equal to the spacing between the pair of rails.

12. The method of claim 7 wherein the disk comprises a substrate.

13. A method for testing a magnetic disk to be used in a disk drive, comprising the steps of:

providing a profilometer;

using the profilometer to measure an outer radial edge of the disk, along a radius extending outwardly from the center of the disk, to obtain a series of dimensions representing a height profile;

providing a processor;

coupling the processor to the profilometer to receive the dimensions measured by the profilometer; and using the processor to process the measured dimensions to determine a slope value for each of a pair of radial segments of the disk, to calculate a difference value between the slope values of the pair, to compare the difference value to a preselected threshold difference value and to indicate when the difference value is equal to or less than the threshold difference value.

14. The method of claim 13, comprising the further step of:

using the processor to correlate the indicated difference value to a radius of the disk, to compare the correlated radius to a predetermined radius value and to indicate when the correlated radius is equal to or greater than the predetermined radius value.

15. A method for making a magnetic disk to be used in a disk drive, comprising the steps of:

providing a substrate;

providing a profilometer;

using the profilometer to measure an outer radial edge of the substrate, along a radius extending outwardly from the center of the substrate, to obtain a series of dimensions representing a height profile, providing a processor;

coupling the processor to the profilometer to receive the dimensions measured by the profilometer;

using the processor to process the measured dimensions to determine a slope value for each of a pair of radial segments of the substrate, to calculate a difference value between the slope values of the pair, to compare the difference value to a preselected threshold difference value and to indicate when the difference value is equal to or less than the threshold difference value; and when the difference is indicated to be equal to or less than the threshold difference value, using the substrate to make a magnetic disk.

16. A method for making a magnetic disk to be used in a disk drive, comprising the steps of:

providing a substrate;

providing a profilometer;

using the profilometer to measure an outer radial edge of the substrate, along a radius extending outwardly from the center of the substrate, to obtain a series of dimensions representing a height profile;

providing a processor;

coupling the processor to the profilometer to receive the dimensions measured by the profilometer;

using the processor to process the measured dimensions to determine a slope value for each of a pair of radial segments of the substrate, to calculate a difference value between the slope values of the pair, to compare the difference value to a preselected threshold difference value and to indicate when the difference value is equal to or less than the threshold difference value;

using the processor to correlate the indicated difference value to a radius of the substrate, to compare the correlated radius to a predetermined radius value and to indicate when the correlated radius is equal to or greater than the predetermined radius value; and when the difference is indicated to be equal to or greater than the predetermined radius value, using the substrate to make a magnetic disk.

* * * * *